No. 630,369. Patented Aug. 8, 1899.
G. A. LOWRY.
APPARATUS FOR COMPRESSING COTTON, &c.
(Application filed June 8, 1898.)
(No Model.)
7 Sheets—Sheet 1.

Witnesses:
R. A. White.
Harold G. Barrett

Inventor:
George A. Lowry
by Brown & Darby attys

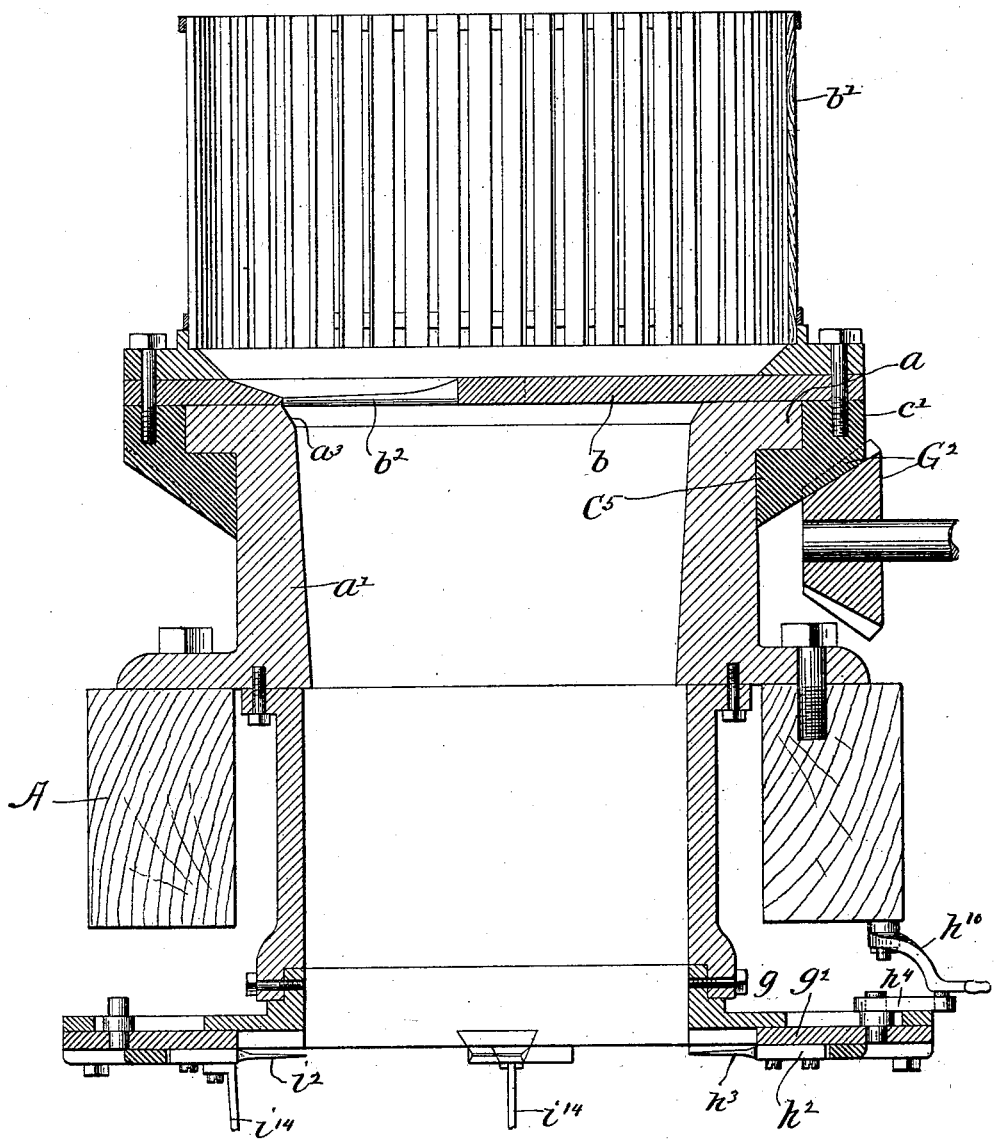

No. 630,369. Patented Aug. 8, 1899.
G. A. LOWRY.
APPARATUS FOR COMPRESSING COTTON, &c.
(Application filed June 8, 1898.)
(No Model.) 7 Sheets—Sheet 3.
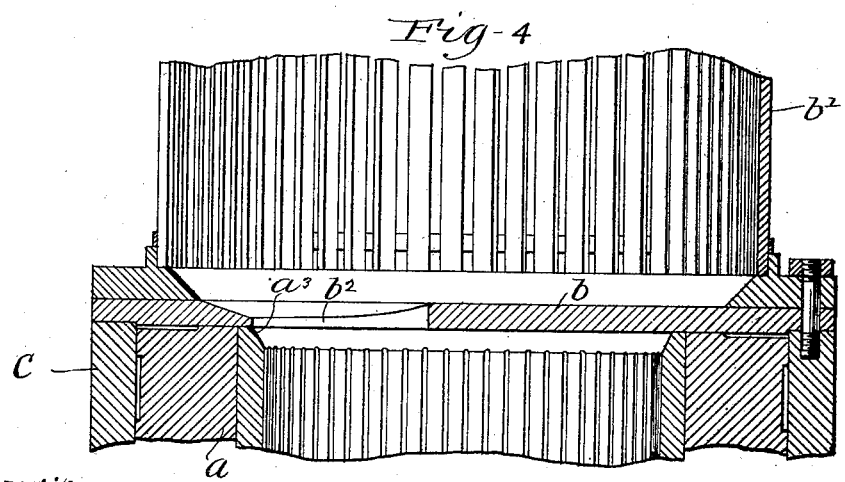

No. 630,369. Patented Aug. 8, 1899.
G. A. LOWRY.
APPARATUS FOR COMPRESSING COTTON, &c.
(Application filed June 8, 1898.)
(No Model.) 7 Sheets—Sheet 4.
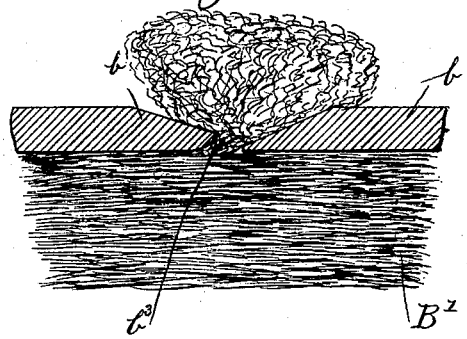
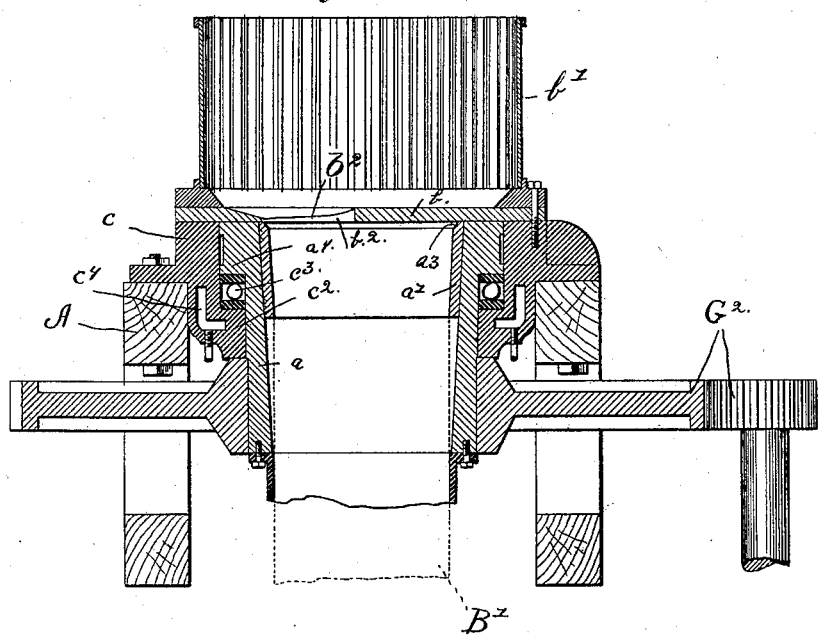

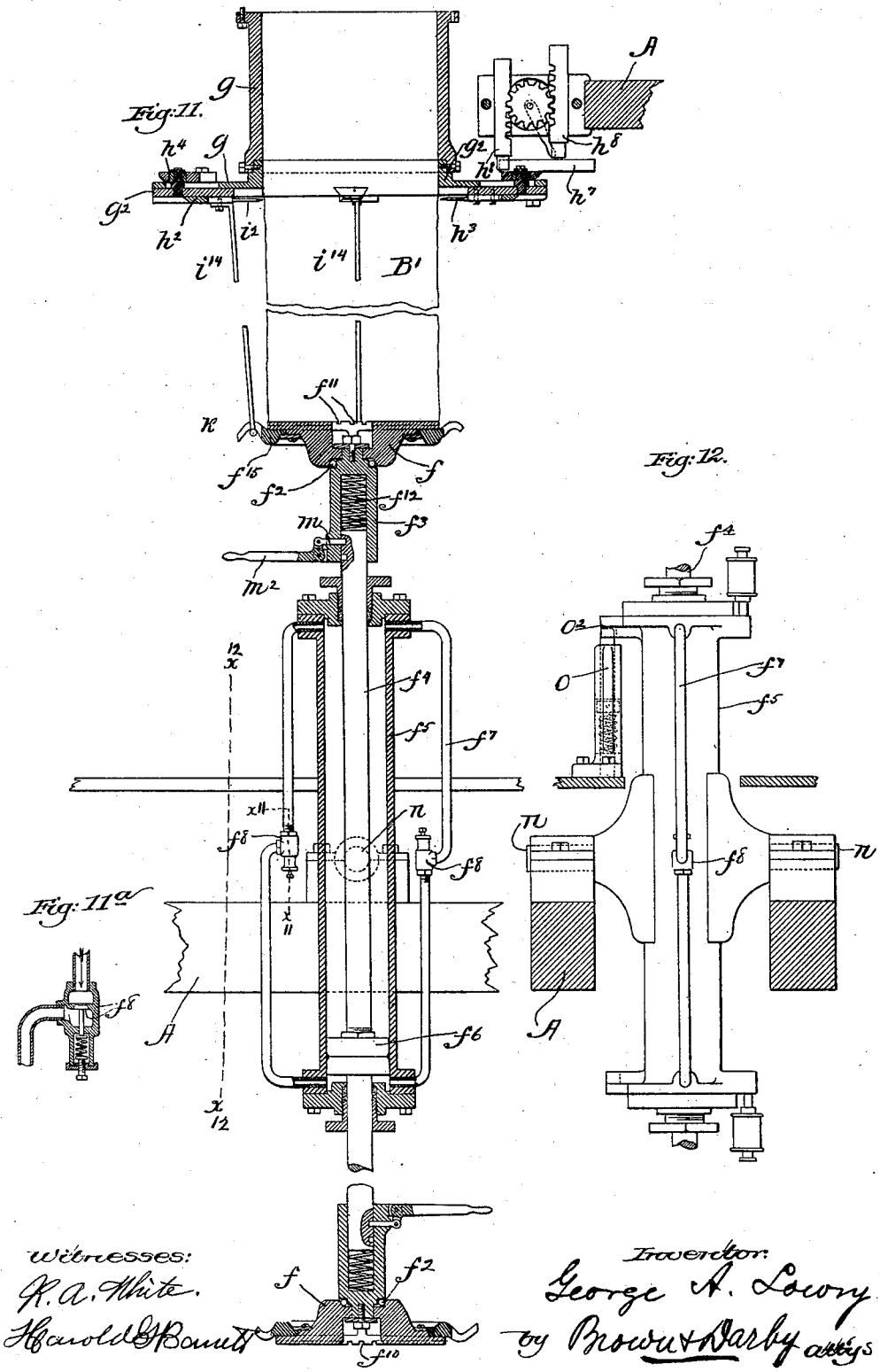

No. 630,369. Patented Aug. 8, 1899.
G. A. LOWRY.
APPARATUS FOR COMPRESSING COTTON, &c.
(Application filed June 8, 1898.)
(No Model.) 7 Sheets—Sheet 6.
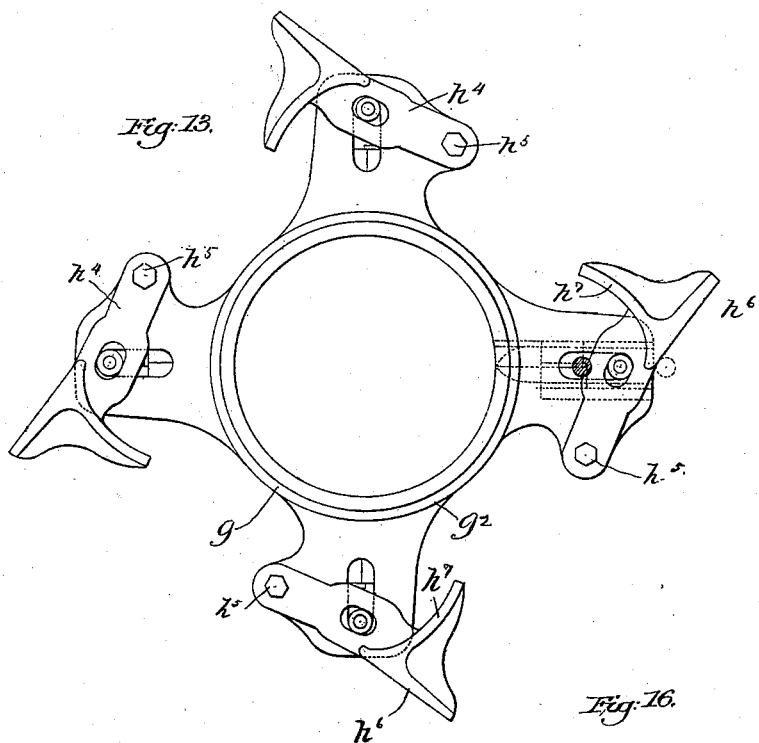
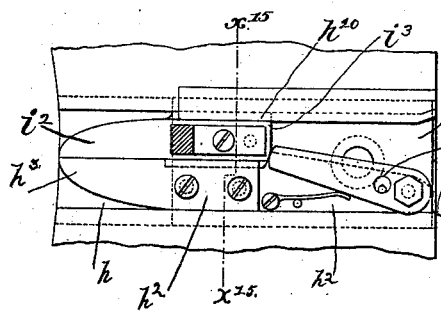
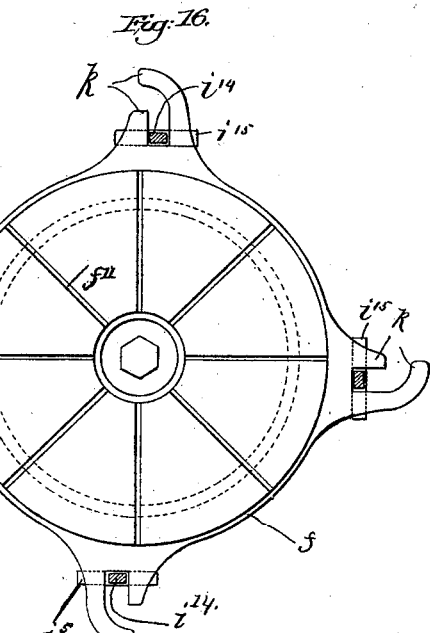
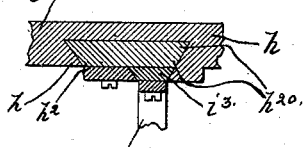

No. 630,369. Patented Aug. 8, 1899.
G. A. LOWRY.
APPARATUS FOR COMPRESSING COTTON, &c.
(Application filed June 8, 1898.)

(No Model.) 7 Sheets—Sheet 7.

UNITED STATES PATENT OFFICE.

GEORGE A. LOWRY, OF CHICAGO, ILLINOIS, ASSIGNOR TO THE PLANTERS COMPRESS COMPANY, OF WEST VIRGINIA.

APPARATUS FOR COMPRESSING COTTON, &c.

SPECIFICATION forming part of Letters Patent No. 630,369, dated August 8, 1899.

Application filed June 8, 1898. Serial No. 682,947. (No model.)

*To all whom it may concern:*

Be it known that I, GEORGE A. LOWRY, a citizen of the United States, residing at Chicago, in the county of Cook and State of Illinois, have invented a new and useful Apparatus for Compressing Cotton or other Fibrous Material, of which the following is a specification.

This invention relates to apparatus for compressing cotton or other fibrous material.

The object of the invention is to provide an apparatus of improved construction and arrangement for efficiently condensing, compressing, and baling cotton, wool, or other material.

The invention consists, substantially, in the organization and the combinations, arrangements, and constructions hereinafter set forth, illustrated in the accompanying drawings, and finally pointed out in the appended claims.

Figure 1:
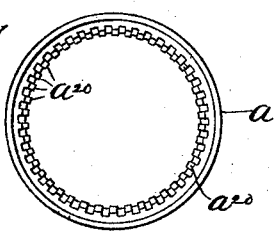
Figure 7:
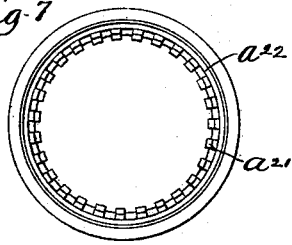
Figure 2:
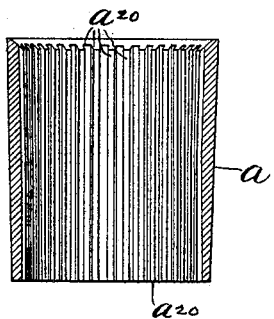
Figure 8:
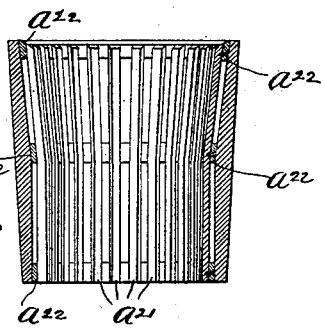
Figure 9:
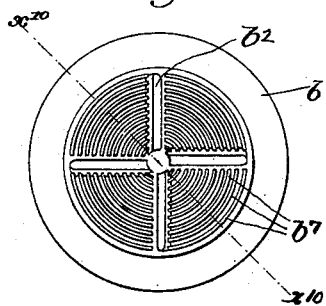
Figure 10:
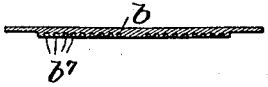
Figure 17:
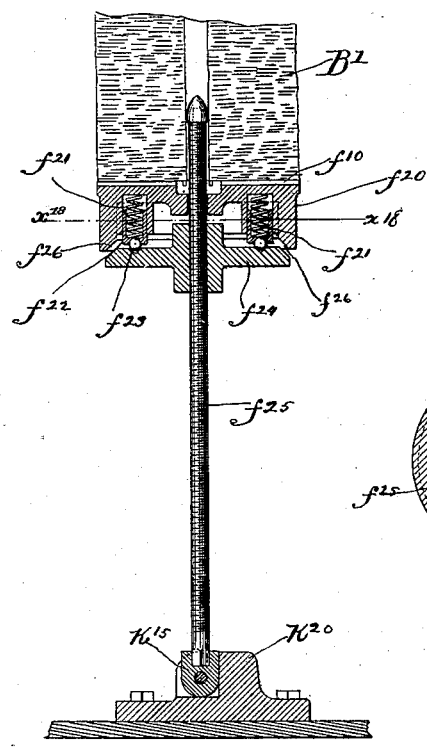
Figure 18:
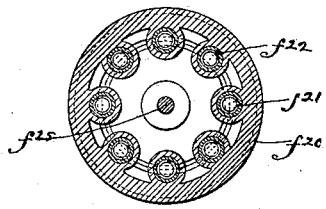

Referring to the accompanying drawings and to the various views appearing thereon illustrating the several inventions or selected species of various possible embodiments of the principles thereof, Figure 1 is an end view of a form of chamber or holder adapted for use in connection with my invention. Fig. 2 is a central longitudinal section of the same. Fig. 3 is a central longitudinal section of a form of receiving and compressing apparatus embodying the principles of my invention. Fig. 4 is a similar view, parts broken away, illustrating a slightly different construction included in the scope of my invention. Fig. 5 is an enlarged sectional detail view showing a portion of the compressed material and illustrating certain steps in the operation. Fig. 6 is a longitudinal sectional view of a portion of the machine having a modified arrangement. Fig. 7 is a view similar to Fig. 1, showing a slightly different form of chamber or holder. Fig. 8 is a central longitudinal section of the form of chamber or holder shown in Fig. 7. Fig. 9 is a bottom plan view of a form of cap or head adapted for use in connection with my invention. Fig. 10 is a transverse section of the same on line $X^{10} X^{10}$, Fig. 9. Fig. 11 is a central longitudinal sectional view of a form of apparatus for supporting the compressed material as it issues from the compressing apparatus and showing means for detaching or separating portions from such compressed material to form the bales. Fig. 11$^a$ is a broken detached sectional detail view on the line $X^{11} X^{11}$, Fig. 11. Fig. 12 is a view in side elevation, parts broken and parts in section, on the line $X^{12} X^{12}$, Fig. 11, looking in the direction of the arrows. Fig. 13 is a detached detail view in plan of a part of the severing or bale-separating apparatus. Fig. 14 is a detail view, in bottom plan, of one of the sets of separating and retaining devices shown in Fig. 13. Fig. 15 is a transverse sectional view of the same on line $X^{15} X^{15}$, Fig. 14. Fig. 16 is a detached detail view in plan of a form of bale-support or platen embodying the principles of the invention. Fig. 17 is a view similar to Fig. 11, illustrating a form of means for receiving and supporting the bale of a construction somewhat different from that shown in Fig. 11, but included within the principles of my invention. Fig. 18 is a transverse section of the same on line $X^{18} X^{18}$, Fig. 17.

In my Patents Nos. 581,600 and 581,601, granted April 29, 1897, I have described and claimed an apparatus for compressing cotton and other fibrous material, in which apparatus, as in that hereinafter described, there are employed a chamber or holder open at both ends and a slotted cap or head for one end of said chamber, these parts being mounted for relative rotation. In the operation of a baling apparatus embodying these generic features the chamber is first filled by hand or otherwise with the material to be condensed or compressed, and then by imparting a relative rotation to the chamber and cap and supplying additional material to or adjacent to the slot or slots in the cap such additional material is caught or engaged by the material previously introduced into the chamber and drawn into such chamber, and thus compressed and formed into condensed flattened spiral layers, the body of material contained in the chamber being augmented endwise by each spiral layer thus added thereto and correspondingly advanced through the chamber, finally emerging from the chamber in the form of a column in a highly condensed or compressed state, and it was set forth in such patents that the relative rotation of the chamber and cap might be secured by rotating either one or both of these parts.

The present invention relates to apparatus operating substantially as above set forth and embodying improvements in organization, arrangement, and construction, and also additional features, all as will be pointed out hereinafter.

In the accompanying drawings, wherein the same part is designated by the same reference-sign wherever it occurs throughout the several views, reference-sign $a$ designates the chamber or holder, $b$ the cap or head, and $c$ the supporting-casing. As shown in Fig. 6, rotation is imparted to chamber $a$ through suitable gears $G^2$ from any suitable or convenient source of power. Casing $c$ is suitably supported upon a framework A and is provided with an internal flange or shoulder $c^2$, arranged to receive and form a bearing for a peripheral flange or shoulder $a^4$ on the chamber $a$. If desired, and in order to reduce friction, antifriction-balls, as indicated at $c^3$, may be interposed between flanges or shoulders $c^2$ and $a^4$. If desired, and in order to dissipate heat generated during the operation of the apparatus, the casing $c$ may be cored, as at $c^4$, to form a water-jacket. In this form of the apparatus the cap $b$ is bolted or otherwise secured to casing $c$ or other fixed or rigid part of the machine. In Fig. 3 I have shown a construction wherein the chamber is held stationary while the cap is rotated. In this form of construction the chamber $a'$ may be rigidly held by being bolted or otherwise secured to the framework or other fixed part of the machine, while the cap may form part of or may be bolted or otherwise secured to a collar $c'$, shouldered, as at $C^5$, to fit a flange $a^5$ on the chamber, and to which rotation may be imparted in any suitable or convenient manner, as by means of gears $G^2$, from any convenient source of power.

As shown in my patents above mentioned, the material to be compressed is introduced to the chamber through slots in the cap, which is in the form of a removable plate having one or more slots $b^2$ formed therethrough.

The material may be supplied to the feeding head or cap in any suitable or convenient manner. In the drawings I have shown a simple and efficient construction for this purpose, wherein I provide a basket or receptacle $b'$, open at both ends and suitably mounted upon or over the feed head or cap. Into this basket or receptacle the material may be delivered. This basket or receptacle may be dispensed with, however, if desired, or its construction or arrangement varied without departure from the spirit or scope of my invention.

The loose material is supplied in bulk to the cap either by delivering such material on top of the cap or by delivering it into the receptacle $b'$, if such receptacle is employed. The fibers of this loose material, which are more or less interlaced or entangled, when brought into sufficient proximity to the surface of the end of the material contained in the chamber are engaged or become entangled or interlaced with the fibers of such material in the chamber when said chamber and cap are relatively rotated and are drawn through the slot or slots into the chamber in the form of a thin condensed layer, and additional material supplied will in like manner be engaged and drawn along by and with the material that is already engaged with the compressed mass below, and which is thereby drawn through the inlet slots or openings in the cap-plate, so that some portion of the loose material delivered to the cap will thus find its way to one or another of the slots, and hence the entire bulk of the loose material will be drawn into the chamber. It is evident that a small amount of material at a time may be highly compressed more readily and thoroughly than can a large quantity of such material, and therefore the action of the machine in drawing the material to be compressed into the chamber through a comparatively narrow slot, whereby such material is drawn into the machine in the form of a thin sheet or layer, is particularly effective in highly condensing and compressing the material, because the operation is upon a small quantity of material at any given moment in the operation. This highly-compressed layer of material, which has been drawn into the receiving-chamber or holder, is by the relative rotation of the cap and chamber caused to be deposited in a spiral layer upon the end of the column of material previously compressed, and thus adds during the relative rotation successive increments to the previously-introduced material, which are laid on the end of the column thereof next adjacent to the inner surface of the cap, and this added increment also correspondingly advances the subjacent column of compressed material through the chamber. In this manner the column of compressed material is built up of spirally-laid highly-compressed layers, applied progressively and continuously, or substantially so, to the end of the column, the cap serving as an abutment against which the receiving end of the column of compressed material in the chamber bears, and hence aiding in advancing the column through the chamber as the condensed layers are added thereto.

As above pointed out, the cap $b$ not only serves as a feeding-head, but also as an abutment by which the material compressed by its passage under the compressing edge of the inlet-slot into a flattened layer is retained pressed upon the end of the column, thereby securing great density of compression in the column in the direction of its length and preventing expansion of the material endwise at this end of such column. By reason of the relative rotation of this head or cap and the chamber $a$ it will be seen that the inner surface thereof is subjected to wear against the end of the column. In order, therefore, that the contacting portion of the cap (which may be of hardened metal) may be readily removed and replaced by a new one when worn by continued friction on its inner surface, I prefer to make the under or wearing portion of said cap in the form of a removable plate or disk, as clearly shown in the drawings.

Under some conditions of operation it may be desirable to reduce the friction of contact between the relatively rotating or moving adjacent surfaces of the cap and the column of material being compressed to some extent. This result may be accomplished in many different ways. In Figs. 9 and 10, as an illustration of an operative construction embodying this idea, but to which, however, the invention is not limited, I have shown the inner surface of the cap $b$ formed with grooves $b^7$. These grooves may be arranged in any suitable manner; but in the construction where the relative movement of the cap and column of material contained in the chamber is a rotary movement of one of these parts the grooves $b^7$ should be arranged substantially concentric with the axis of rotation of the rotating part. In order to prevent binding of the material in the grooves by the expansive tendency of the material toward the grooved surface of the cap due to the compression to which the material is subjected, the grooves $b^7$ are preferably of minimum width and depth at the curved or compressing lip $b^3$ of the slots and increase very slightly in depth or width, or both, from such lip to the other lip of the next adjacent slot. By the provision of the grooves $b^7$ the area of frictional surface of the cap is reduced, and by arranging said slots in concentric relation to the axis of rotation of the movable part and by slightly increasing the dimensions of said grooves from the compressing edge or lip of one slot to the other edge or lip of next adjacent slot rearward with reference to the direction of relative rotation of the cap and chamber I avoid the tendency of the grooves to form a lock between the column of compressed material and the cap, which would tend to prevent relative rotation of these parts.

In order to insure a relative rotation of the cap and column of compressed material contained in the chamber, it may be desirable in some instances to provide special means for locking or clutching the compressed column of material to its surrrounding chamber or sleeve, thereby preventing rotation of the column within the chamber or sleeve relative thereto. Many specifically different arrangements may be devised for accomplishing this result in case it may be desired to resort thereto. While, therefore, I have shown and will now describe specific constructions embodying the idea, I desire it to be understood that I do not confine or limit myself thereto. In one form shown I provide the interior surface of the chamber $a$ with longitudinal ribs or projections $a^{20}$, as shown in Figs. 1 and 2. Preferably, though not necessarily, these ribs or projections and the intermediate grooves formed thereby are formed slightly tapering in width and depth, the grooves contracting in width and growing more shallow as they approach the delivery end of the chamber, where finally they may disappear. By this construction it will be seen that the column of compressed material contained in the chamber engages with the ribs or projections and will thereby be locked and held against relative rotation within the chamber or sleeve $a$, thus insuring a relative rotation between the column of compressed material and the cap whether such relative rotation is secured with a stationary cap and rotating chamber or a rotating cap and stationary chamber. It will also be seen that by arranging the ribs or projections to extend longitudinally of the chamber they do not offer obstruction to the advancement of the column through the chamber, and by tapering the grooves and ribs, as above described, the greatest holding or locking effect is secured adjacent to the receiving end of the chamber, that being the point where is developed the greatest tendency of the column to slip relative to the chamber. The grooves thus formed may also serve as passages for the escape of air or moisture expelled from the material during compression, thus forming ventilating-spaces for the compressed column contained in the chamber.

Instead of grooving or forming ribs on the internal surface of chamber $a$ such grooves or ribs may be formed on the internal surface of a sleeve, (see Fig. 6,) which is suitably arranged in the chamber.

In Figs. 7 and 8 I have shown a slightly-modified construction, wherein the locking means are in the form of longitudinal bars $a^{21}$, suitably held or supported in rings or hoops $a^{22}$ and arranged within the chamber $a$. This construction provides an engaging device and a series of longitudinal ventilating-spaces around the entire column within the chamber. It is obvious that the provision of special means, such as above described, for locking or clutching the column of compressed material against rotation within and relative to the chamber may be entirely dispensed with and the frictional contact between the material and the inner surface of the chamber alone depended upon to secure the desired clutching effect. In case of great density of compression, however, a locking means might be found useful.

In order to facilitate the passage of the material through the slots $b^2$ and to insure engagement with the walls of the chamber, so as to form an initial resistance to the advancement of the several layers immediately after being superimposed upon the end of the column, as well as to insure the presence of sufficient material to fill the chamber with compacted material at and from the very top, the edge of chamber $a$, if desired, may be slightly beveled or chamfered, as at $a^3$, Figs. 3, 4, and 6. This enables the material after passing into the chamber to quickly gain a resistance bearing against the inner surface of the chamber, thus enabling the clutching action of the holder upon the compressed material to begin at a point close to the top. A bevel whereby the diameter of a cylindrical holder is reduced one-half inch at the point $a^3$ results in efficient action.

In order to compress the material as it is drawn into the receiving-chamber, as above described, it is necessary to provide means for resisting the movement of the compressed material away from the abutment, or, in other words, for maintaining its pressure against the abutment, so that the new material entering between the abutment and the condensed material is itself compressed to the point where its resistance to further compression is sufficient to overcome the resistance that holds the mass of compressed material against the abutment. The friction of the material against the interior wall of the chamber, if the latter is of sufficient length, of itself affords such a resistance to a certain degree, and I have found in practice that a simple, inexpensive, and efficient manner of securing such resistance is to contract slightly the bore of the holder or receiving-chamber for the whole or some portion of its length in the direction of the passage of the column of compressed material, whereby also a sufficient clutching engagement between the walls of the chamber or holder and the column of compressed material is assured. It is evident that the greater the contraction of this bore and the greater the length of the cylinder the greater will be the resistance to the passage of the column which will be thereby afforded. A holder or chamber of comparatively small length in relation to its diameter may cause the material to buckle at the center, and the use of a cylinder of very great length relatively to its diameter requires an excessive amount of power to force the column through the cylinder. In practice I have found that a holder or chamber of about nineteen inches in diameter at the end at which the material enters, beveled at the top to a diameter of eighteen inches and a half, as above described, and with a length of about eight inches, is satisfactory and effective, and with a chamber of that size a contraction of about one-half an inch in diameter from the point $a^3$ below the bevel at the top of the chamber to the discharge end of the cylinder is sufficient for effective action. These proportions may, however, be varied without departure from my invention, and it is obvious that either the bevel at the receiving end of the chamber or the contraction of the chamber below may be employed without the other.

Where the resistance to movement of the compressed mass from the abutment by the incoming material is produced wholly by frictional engagement of the sides of the column with the walls of the chamber or holder, whether cylindrical or tapered, there is danger of non-uniformity of condensation of the material due to differences in friction or adhesion, depending on the condition as to dampness, &c., of the material. It may be desirable, therefore, that a counter-abutment should be employed to afford resistance by pressure against the end of the column—such, for example, as the receding platform or support to be hereinafter described—which receives the end of the column after emergence from the holder and the pressure or resistance of which can be properly graduated and maintained substantially uniform, being unaffected by variations in the condition of the material being operated upon.

Other features of my invention reside in providing means for receiving the end of the compressed column as it emerges from the delivery end of the resistance sleeve or chamber $a$ in order to support the same and to prevent the endwise expansion of the column, and also when desired to serve as a counter-abutment to maintain the pressure (or a portion thereof) of the compressed material against the under surface of the cap-plate, as before explained. Many specifically different arrangements may be devised for accomplishing these objects without departing from the spirit or scope of my invention. While, therefore, I have shown and will now describe various constructions and arrangements as operative embodiments of means for accomplishing the desired objects and as the best forms in which I at present contemplate carrying my invention into practice, I desire it to be understood that the specific forms shown are illustrative of the generic principles of my inventions and that my invention is not to be limited or confined thereto.

I will first describe the construction and arrangement shown for receiving and supporting the end of the column B' of compressed material as it emerges from the compressing apparatus, particular reference being had to Figs. 11, 11$^a$, and 12, wherein reference-sign $f^5$ designates a suitable closed cylinder in which is arranged a piston $f^6$, mounted upon a piston-rod $f^4$, which is arranged to project through a suitable stuffing-box in the end of the cylinder, as shown. Two pipes or passages $f^7$ are arranged to open communication between the respective ends of the cylinder $f^5$ on opposite sides of the piston $f^6$. In each pipe or passage $f^7$ is arranged a check-valve $f^8$, the check-valve in one pipe or passage being arranged to seat in the opposite direction with respect to the check-valve in the other pipe or passage. By filling cylinder $f^5$ with a suitable fluid it will be readily seen that the movement of the piston from one end of the cylinder to the other is opposed by the resistance afforded to the flow of fluid from one end of the cylinder to the other through one or the other of pipes or passages $f^7$, according to the direction of movement of the piston, and this resistance may be regulated by suitably regulating the pressure by which the check-valve is held to its seat. It will also be seen that the resistance opposing the movement of the piston is maintained constant and steady throughout the length of its stroke. Upon the end of piston-rod $f^4$ is suitably mounted a supporting head or platform $f$, which may be of any desired size or shape adapted to receive the end of the column of compressed material as it emerges from the compressing apparatus. If desired, and as shown, the head or platform support $f$ may be mounted to freely rotate or revolve upon or with reference to the piston $f^4$. This is particularly desirable in that style of compressing apparatus wherein the chamber or sleeve $a$ revolves, in order to avoid interposing resistance to the rotation of the column of material which rotates with the chamber. If desired, and as shown, in order to reduce to a minimum the friction of rotation of this head or platform $f$ antifriction bearing-balls $f^2$ may be interposed between such head or platform and its bearing upon the piston-rod.

In operation the piston $f^6$ is moved to that end of the cylinder nearest the compressing apparatus and in position for the head or platform $f$ to receive and bear against the end of the emerging compressed column. As the compressed column continues to emerge from the chamber the head or platform recedes against the yielding resistance offered to the flow of fluid from one end of the cylinder to the other around the piston through one or the other of the pipes $f^7$, as the case may be. Thus not only is the emerging compressed column supported, but it is also held against the tendency to expand endwise by reason of the column leaving or emerging from the confining receiving chamber or holder.

By the action of the appliances thus far described—namely, the holder and the abutment—the compressed material is formed into a column in the holder by a substantially continuous addition thereto of one or more films or layers, (one to each slot or inlet opening,) said layers being built or laid spirally upon the end of the previously-compressed mass, which is thus composed of one or more spirally-laid films, and while the cohesiveness and solidity of the mass against separation or expansion laterally is very great, due to the interlocking of the fiber throughout each film or layer, there is substantially no interlocking of the fiber of one layer or turn of the spiral with that of the next, so that the mass is easily separable transversely between the layers as soon as the longitudinal restraint or confinement is removed.

I will now describe means whereby when a sufficient length of the compressed column to form a bale has emerged from the compressing apparatus it may be detached or separated from the material retained in the chamber or sleeve. I do not claim in this application the mechanism for severing the bale nor the pivotal construction whereby the support may be swung out of line with the compressing mechanism because I intend to file a divisional application for such mechanism and construction, in which claims will be made thereto, and such divisional application will be filed prior to the issuance of the patent on this application. This result may be accomplished in many specifically different ways, and while the specific form shown embodies the generic principles of means for accomplishing the desired object I desire it to be understood that the invention is not limited or confined thereto. In the form shown a flanged collar or frame $g$ is suitably mounted upon the delivery end of the sleeve or chamber $a$. Secured to or carried by this collar or frame $g$ is a frame $g^2$, having suitable guideways $h$ formed therein. Preferably these guideways are radially disposed relative to the axis of the compressed material. Suitable blocks or carriers $h^2$ are mounted to slide in these guideways, which blocks carry the severing or separating cutters or blades $h^3$. The cutter blocks or carriers $h^2$ are arranged to be advanced so as to cause the cutters or blades to penetrate the compressed column of material. A simple and efficient arrangement, to which, however, the invention is not limited, is shown for actuating the severing blades or cutters wherein the cutter-carriers are suitably connected to levers or arms $h^4$, pivotally mounted, as at $h^5$, upon frame $g^2$. (See Fig. 13.) A convenient means is shown for rocking the arms or levers $h^4$, comprising a projection formed on or carried by the levers $h^4$, said projection having the cam-surfaces $h^6 h^7$. It will be remembered that the frames $g g^2$ are mounted on the sleeve or chamber $a$. Therefore in the case where such chamber is rotated the frames $g g^2$ are also revolved. Now by arranging an obstruction in the path of the cam-surfaces of levers $h^4$ said levers are rocked about their pivots, thereby advancing or retracting the blades or cutters toward or from the column of material. In Fig. 11 are shown stops $h^8 h^9$, arranged to be projected into the path of cam-surfaces $h^6 h^7$, respectively. Thus when stop $h^8$ is projected into the path of cam-surfaces $h^6$ it will be seen that during the succeeding complete revolution of the chamber $a$ all the levers $h^4$ will be rocked in a direction to cause the blades or cutters to be advanced into the column of material, thus severing or detaching a bale from the end of the column sufficiently to insure the separation of the bale from the column as and when the bale is allowed to be withdrawn, as hereinafter described. Although it would be possible so to organize and operate the severing-blades above described as to completely separate the bale by means of them, in practice it is more convenient to use said blades to separate the bale from the column in part only, thereby forming a line of separation on which the bale will be severed from the column as the bale is withdrawn, as hereinafter described. Instead of the arrangement above described the severing blades or cutters may be advanced by hand or otherwise, as by means of levers $h^{10}$, suitably pivoted upon a convenient part of the framework. (See Fig. 3.)

When a bale has been finally severed or separated from the column, it is important to hold the severed or separated ends of the column and bale, respectively, against the expansion of the material endwise of the bale and column. It will be seen from the foregoing description that since the separating or severing blades or cutters above described are carried by or adjacent to the delivery end of the sleeve or chamber $a$ they may perform the function of holding the column of material contained in the chamber or sleeve from endwise expansion until such cutters are withdrawn from their advanced position, and hence until the severed bale has been removed and a head or platform $f$ is again brought into position against the end of the column. Many specifically different arrangements may be employed for holding the severed or separated end of the bale against endwise expansion. While, therefore, I have shown and will now describe a simple and efficient arrangement for accomplishing the desired result, I do not desire to be limited or restricted thereto. In the form shown detachable plates or blades $i^2$ are arranged to be advanced into the column of compressed material, and by suitably coupling these holding plates or blades to the head $f$ the detached bale is held against endwise expansion. In the form shown the plates or blades $i^2$ are carried by blocks $i^{12}$, mounted to slide in suitable ways in frame $g$. In the form shown one of the ways in which the separating cutter or block slides is extended, as at $h^{20}$, to form a guide for the holder plate or blade. An arm $i^{13}$, connected to the severing-blade carrier and arranged to engage behind the holder blade or block, serves to advance the holder blade or block with the severing or separating blade. When the holding-blade is thus advanced, it clears the edge of its guide $h^{20}$, and hence remains in advanced position when the severing-blade is withdrawn. To each holder blade or plate is connected one end of an arm $i^{14}$, the other end of such arm being attachable in any suitable manner to the head $f$. In the form shown the head or platform $f$ is provided with ears $k$, and cross-pieces $i^{15}$, carried by the ends of rods $i^{14}$, are arranged to engage said ears, thereby detachably locking or clamping the bale between the holding plates or blades $i^2$ and the platform or head $f$. As shown in Fig. 11, the ears $k$ may be formed on a plate $f^{15}$, independent of the head, to enable them to be brought with certainty into line with the blades.

When a bale has been severed or separated by the blades, as above explained, from the end of the compressed column, it is desirable that it be lowered away from the end of the column in order to facilitate its removal. This result may be accomplished in many different ways. In Fig. 11 I have shown a simple and efficient arrangement for accomplishing the desired object wherein instead of mounting the head or platform $f$ directly upon the end of piston-rod $f^4$ said head or platform is mounted upon a sleeve $f^3$, which is mounted upon the piston-rod for slight endwise movement thereon. A spring $f^{12}$ is interposed between the piston-rod and the sleeve $f^3$, said spring normally exerting its tension in a direction to separate the sleeve and piston-rod. A latch $m$, suitably operated by a handle $m^2$, serves to engage and hold the sleeve in the limits of its movements. From this construction it will be seen that when it is desired to remove a separated or severed bale the latch $m$ is disengaged from sleeve $f^3$, thus permitting the weight of the bale to depress the head or platform $f$ against spring $f^{12}$ until the latch $m$ is again in position to lock the sleeve to the piston-rod. In this manner the bale is separated from the column on the line of separation made by the blades, as above described, and withdrawn sufficiently to permit of the ready removal of such bale. Of course many other arrangements may be employed for accomplishing the same result. My invention, therefore, is not limited to the exact construction shown and above described.

After the bale has been separated and withdrawn from the column, as above described, it may be suitably tied or wired, the head or platform $f$ being provided with grooves $f^{11}$, Fig. 11, to permit the tie-wires to be applied to the bale. In order to facilitate the removal of the bale, provision may be made for swinging the platform or head upon which the bale is supported out of line with the compressing apparatus. This result may be accomplished in many different ways. For instance, and as shown, the cylinder $f^5$ and its connected parts may be provided with trunnions $n$, suitably journaled in the framework and upon which said cylinder may rock or swing out of line with the column of compressed material to permit of the removal of the bale from the head or platform carried thereby, and after the bale is finally removed said cylinder may be swung back again into position to receive the next bale. A spring-pressed bolt $o$ may serve to lock the cylinder in position to hold the head or platform in line with the column of compressed material as it emerges from the press.

It will be remembered that the severing or separating blades $h^3$, as above described, are arranged to perform the function of holding the severed end of the column from endwise expansion. In order that said blades may be promptly relieved of this duty and without interrupting the continuous operation of the machine, it may be found desirable to promptly replace a platform or head in position to receive the end of the emerging column while the previously detached or separated bale is being removed. This result may be accomplished in many different ways. For instance, and as shown, the piston-rod $f^4$ may project through both ends of cylinder $f^5$, and each end of said piston-rod may be provided with a supporting head or platform $f$, as shown in Fig. 11. By this construction it will be readily seen that when the cylinder $f^5$ is rocked or swung about its trunnions to remove a bale supported upon one head or platform the other head or platform carried upon the other end of the piston is brought into position to receive the next bale. Thus each detached bale may be removed at leisure without interfering with or interrupting the continuous operation of the machine.

In Figs. 17 and 18 is shown a modified arrangement of receding platform or support for the end of the compressed column B' as illustrative of my invention in this respect. In this form of the invention a threaded rod or bar $f^{25}$ is suitably stepped in a block $k^{15}$, pivotally mounted in a base $k^{20}$. A plate or disk $f^{24}$, having a threaded hub, is mounted to travel on the threaded rod or bar $f^{25}$. A platform or head $f^{20}$ is mounted to freely rotate upon bar or rod $f^{25}$ and constitutes the supporting head or platform for the end of the column B' as it emerges from the press. A suitable ball-bearing, as indicated at $f^{23}$, may be interposed between head or platform $f^{20}$ and the plate or disk $f^{24}$, and the head or platform is yieldingly supported with reference to plate or disk $f^{24}$, as by means of interposed springs $f^{21}$, held in place by retainers $f^{22}$, as clearly shown. These springs normally operate to maintain the head or platform and plate or disk yieldingly separated. These parts may be provided with suitable frictional engaging surfaces $f^{26}$, whereby when the plate or platform $f^{20}$ is sufficiently depressed against the action of springs $f^{21}$ the plate or disk $f^{24}$ is engaged and caused to rotate with the head or platform $f^{20}$, which in turn rotates with the column of compressed material. The rotation of plate or disk $f^{24}$ causes said plate or disk to travel as a nut on the threaded rod $f^{25}$, thus securing the desired receding movement of the platform or head $f^{20}$ as the column continuues to emerge from the press. The rod $f^{25}$ is accommodated during the advancement of the column in the longitudinal central opening formed therein, as clearly shown, and when a bale is finally completed and separated this rod may either be withdrawn or may remain and serve as part of the bale-holding means.

The operation of the apparatus will be readily understood from the foregoing description and is as follows: The material to be compressed is suitably delivered to or upon the feeding head or cap and relative rotation is imparted to the head or cap and chamber, the chamber having previously been preliminarily filled by hand or otherwise to a point such as to cause the contents thereof to exert some pressure against the inner surface of the cap. By the relative rotation of the chamber and cap the material supplied to the cap which approaches the surface of the material contained in the chamber is caught by the material in the chamber and drawn through the slot or slots in the cap under the compressing edges of the slots and between the inner surface of the cap and the end of the column or mass of material contained in the chamber. The material thus drawn into the chamber at each slot is condensed and compressed into a thin flat spiral by the action of the contracting neck or throat formed between the compressing edge of the slot and the surface of material contained in the chamber and is applied to the end of the column or mass contained in the chamber in a spiral layer. In this manner the column of material is built up endwise, each relative rotation of the chamber and cap adding one or more flattened, condensed, and compressed layers, depending upon the number of slots in the feeding-head, and each increment or layer thus added causing the column to be correspondingly advanced through the chamber against the resistance offered to its passage through the chamber—as, for example, that offered by the friction of the internal surface thereof and that due to the contraction in internal diameter of the chamber toward the delivery end thereof—thus securing an endwise compression of the column. The end of the column finally emerges from the chamber, where it is received upon a yielding support or platform, which serves to prevent endwise expansion of the column. During the operation the material in the chamber is held against rotation within or from slipping against the walls of the chamber by frictional bearing against said walls or otherwise, thus insuring the necessary relative rotation between the chamber and the material in the chamber on the one part and the cap on the other. When, finally, a sufficient length of the column has emerged from the chamber to form a bale, the severing cutters or blades are advanced, thereby sufficiently severing the bale to enable it to be detached on the line of penetration of the blades. The bale-holders are also applied to prevent endwise expansion of the severed length or bale and the bale is removed, binding-wires or similar devices and, if desired, a bag or covering being applied thereto.

While I have shown and described specifically an apparatus in which the holder and properly-slotted cap-plate have a relative motion of rotation to form a cylindrical bale of compressed material, that being the best form of apparatus known to me, it is obvious that many features of my invention are equally applicable to an apparatus having a holder and properly-slotted cap-plate of different form, provided they have such relative motion as is required to make the shape of bale which they are designed to produce.

Many features of my invention may be used without the others, and many changes in the details of construction and variations in the arrangement and location of the parts may be made by persons skilled in the art and still fall within the spirit and scope of my invention. I desire it to be distinctly understood, therefore, that my invention is not limited to the exact details herein shown and described; but, Having now set forth the object and nature of my invention and a form of apparatus embodying the same, what I claim as new and useful and of my own invention, and desire to secure by Letters Patent of the United States, is—

1. A machine for compressing fibrous material, comprising a holder adapted to engage the sides of a column of compressed material, a cap or abutment provided with one or more inlet-openings, each having an inclined compressing edge or lip, means for moving one of said elements with relation to the other to cause the said inlet-openings to travel with relation to the end of the column of compressed material in contact with said abutment, and a resisting counter-abutment for receiving the other end of said compressed column and preventing expansion thereof as the column emerges from the holder, as and for the purpose set forth.

2. In a machine for compressing fibrous material, a chamber forming a holder adapted to embrace a portion of a column of compressed material, means for condensing the material upon one end of said column and correspondingly advancing said column through the holder including a cap or abutment, and a support for the column as it emerges from the holder, said support and cap serving to sustain and prevent expansion of the mass of compressed material after emerging from the holder, as and for the purpose set forth.

3. In a machine for compressing fibrous material, a chamber, and means for continuously feeding the material into and through such chamber and subjecting the same to pressure, in combination with means for receiving, supporting and preventing expansion of the material after it is compressed and as it emerges from such chamber, as and for the purpose set forth.

4. In a machine for compressing fibrous material, a holder adapted to embrace a portion of the column of compressed material, means for condensing the material upon one end of said column and correspondingly advancing said column through the holder, and a movable support for the column as it emerges from the holder, between which and an abutment at the other end of the holder the column is maintained under compression, and means for yieldingly resisting the receding movement of said support, as and for the purpose set forth.

5. In a machine for compressing fibrous material, a chamber, and means for continuously feeding the material into and through such chamber and subjecting the same to pressure, in combination with a receding support adapted to receive the compressed material as it emerges from such chamber and support the same against expansion, as and for the purpose set forth.

6. In a machine for compressing fibrous material, a chamber, a slotted cap for one end of such chamber, and means for relatively rotating said chamber and cap, whereby material supplied to said cap is drawn into said chamber and compressed, in combination with a support arranged to receive said compressed material as it emerges from said chamber and hold it against expansion, as and for the purpose set forth.

7. In a machine for compressing fibrous material, a chamber open at both ends, a slotted cap for one end of such chamber, said chamber contracting in internal diameter from one end toward the other, and means for relatively rotating said chamber and cap, whereby material supplied to said cap is drawn into and forced through said chamber and is compressed, in combination with a receding support arranged to receive the compressed material as it emerges from such chamber, as and for the purpose set forth.

8. In a machine for compressing fibrous material, a chamber open at both ends, a stationarily-mounted slotted cap-plate for one end of said chamber and means for rotating said chamber, in combination with a receding support arranged to receive the compressed material as it emerges from said chamber, said support mounted to rotate, as and for the purpose set forth.

9. In a machine for compressing fibrous material, a chamber, a stationarily-mounted cap for one end of such chamber, said cap being slotted, and means for rotating said chamber, in combination with a receding support arranged to receive the compressed material as it emerges from the chamber, said support mounted to rotate with the material, and means for yieldingly resisting the receding movement of said support, as and for the purpose set forth.

10. In a machine for compressing fibrous material, an open-ended chamber, a slotted cap for one end of said chamber, and means for relatively rotating said chamber and cap, said chamber provided with longitudinal ribs on the inner surface thereof, said ribs varying in width and thickness from the inlet toward the delivery end of said chamber, as and for the purpose set forth.

11. In a machine for compressing fibrous material, an open-ended chamber, a slotted cap for one end of said chamber, and means for relatively rotating said chamber and cap, said chamber provided with ventilating-spaces in the inner surface thereof, whereby the compressed material is ventilated, as and for the purpose set forth.

12. In a machine for compressing fibrous material, a holder for the compressed material, a slotted cap for one end of said holder, said cap forming an abutment for the compressed material, and means for relatively moving said holder and cap, said cap provided with grooves on the inner surface thereof, whereby the area of frictional contacting surface between the cap and material is reduced, as and for the purpose set forth.

13. In a machine for compressing fibrous material, a holder for the compressed material, a slotted cap for one end of said holder, said cap forming an abutment for the compressed material, and means for relatively rotating the holder and cap, said cap being provided with concentric grooves on the inner surface thereof, as and for the purpose set forth.

14. In a machine for compressing fibrous material, a holder for the compressed material, a cap for one end of said holder, said cap provided with one or more inlet openings or slots, and having grooves on the inner surface thereof, said grooves increasing in dimension from the compressing edge of one of said slots toward the next adjacent slot, and means for relatively rotating said holder and cap, as and for the purpose set forth.

15. In a machine for compressing fibrous material, a holder for the compressed material, a cap for one end of such holder, said cap provided with one or more slots and forming an abutment for the compressed material, the end of said holder adjacent to said cap being chamfered or beveled, as and for the purpose set forth.

16. In a machine for compressing fibrous material, an open-ended holder, a slotted cap for one end of said holder, the surface of said cap being beveled or inclined toward the slot therein, and means for relatively rotating the holder and cap, in combination with an open-ended basket or receptacle arranged over the cap and arranged to receive and guide the material supplied to the cap, as and for the purpose set forth.

In witness whereof I have hereunto set my hand, this 4th day of June, 1898, in the presence of the subscribing witnesses.

GEORGE A. LOWRY.

Witnesses:
 CARRIE C. EDMANDS,
 CLARENCE ALFRED BUNKER